Figure 1:
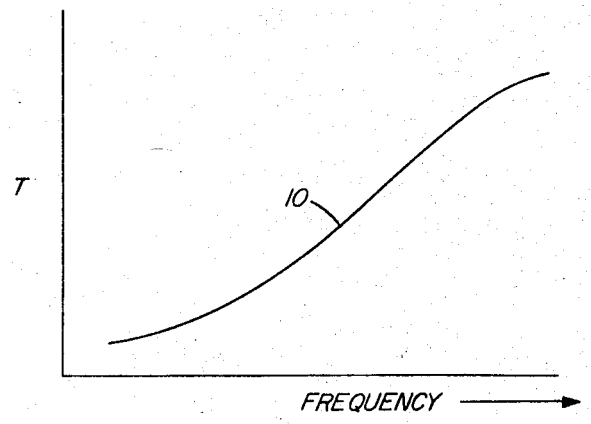
Figure 2:
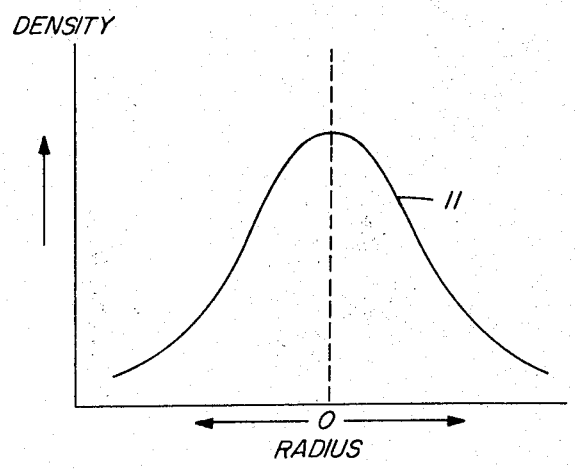
Figure 3:
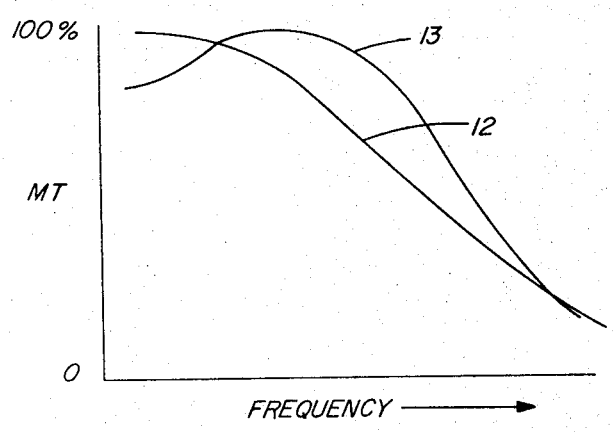
Figure 5:
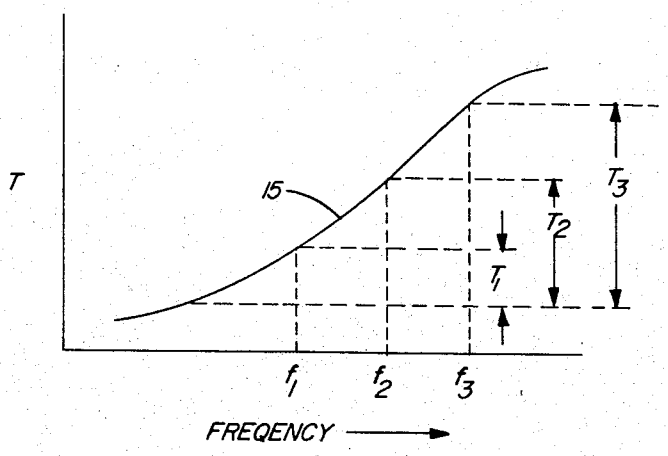
Figure 7:
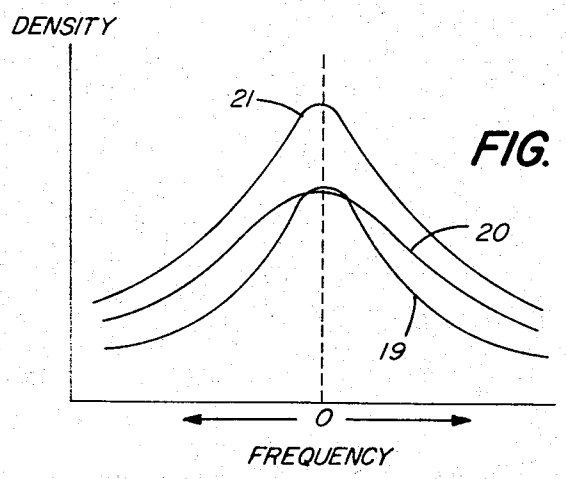
Figure 4:
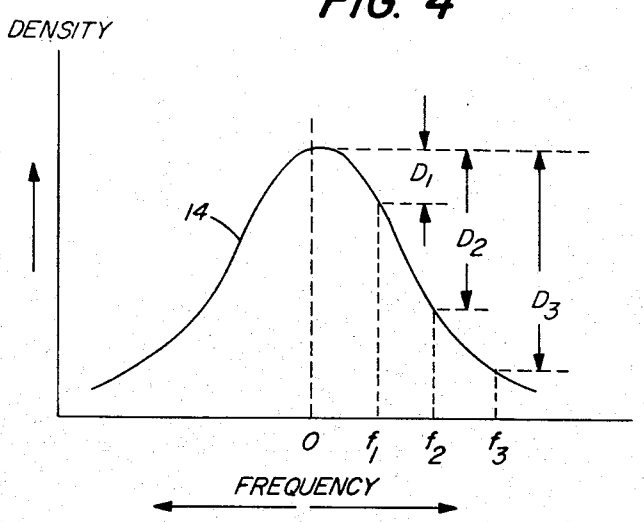
Figure 6:
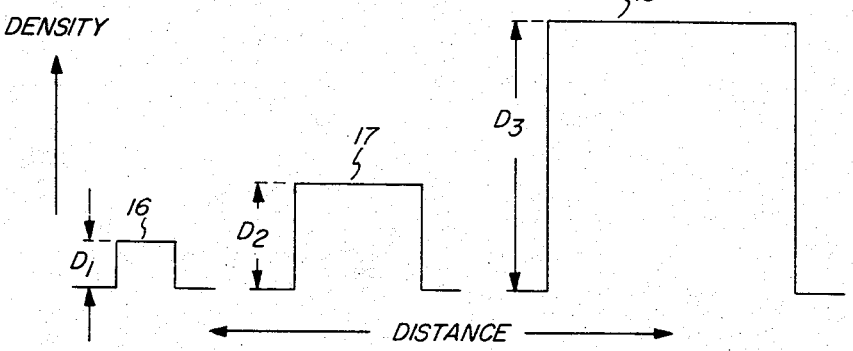
Figure 8:
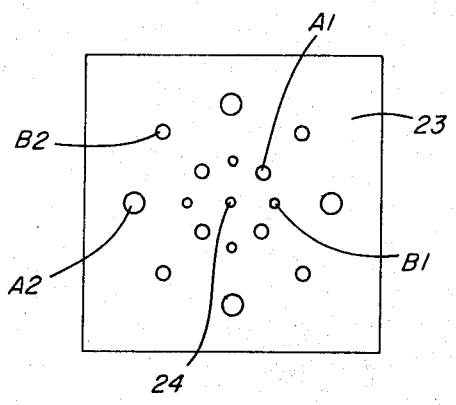
Figure 9:
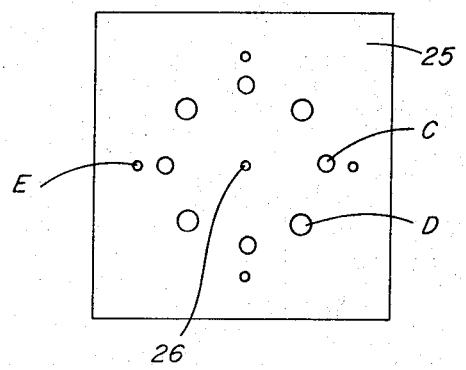
Figure 10:
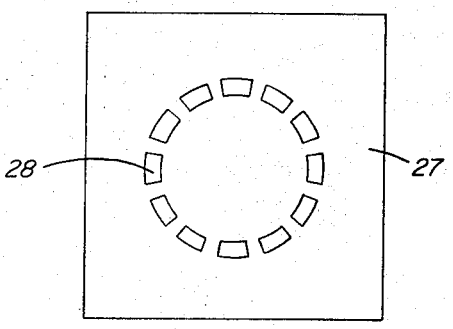

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 7

T909,010
SPATIAL FILTER

John R. Kelch, % Eastman Kodak Co., Kodak Park Division, Rochester, N.Y. 14650

Filed July 13, 1972, Ser. No. 271,339
**Int. Cl. G02b *5/20***
U.S. Cl. 350—162 SF
3 Sheets Drawing. 13 Pages Specification

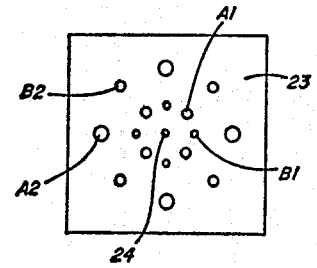

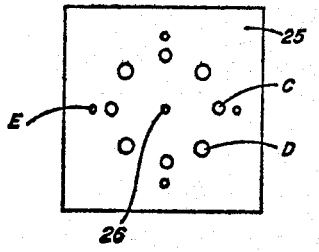

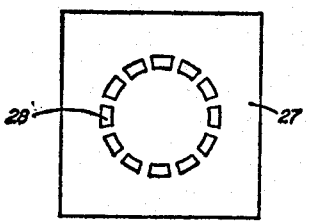

An improved spatial filter for use in an optical system and with which the quality of the projected image is enhanced comprises a transparent support and filter areas arranged in a particular array on a surface of the support. The array is symmetrical with respect to the optical axis of the projection system, when the filter is positioned therein. The spatial filter is produced by exposing a photographic plate positioned in the Fourier transform plane of the optical system to a number of light sources, the beams of which are directed through a circularly symmetric array of apertures in a plate as shown in the drawings. The resulting filter after processing, is a corresponding array of areas whose density is an increasing function of radial distance from the optical axis. The filter is positioned in the Fourier transform plane of a transparency having a variable density image. When the transparency is arranged relative to the axis of the optical projection system, it is illuminated with a plurality of generally parallel light beams of uniform diameter and intensity which are produced by a plate having an array of holes arranged in the same manner as those in the plate used to form the spatial filter but in which the holes are of the same size or smaller than the corresponding holes in the plate used to form the spatial filter. This pattern of light is diffracted by the transparency and with the use of a spatial filter having light-absorbing areas, enhancement of the sharpness and quality of the projected image is achieved.

SPATIAL FILTER

Filed July 13, 1972 3 Sheets-Sheet 1